United States Patent
Szakálos et al.

(10) Patent No.: US 12,318,872 B2
(45) Date of Patent: Jun. 3, 2025

(54) OVERLAY WELDING MATERIAL

(71) Applicant: BLYKALLA AB, Oskarshamn (SE)

(72) Inventors: Peter Szakálos, Stockholm (SE); Peter Domstedt, Bromma (SE)

(73) Assignee: BLYKALLA AB, Oskarshamn (SE)

( * ) Notice: Subject to any disclaimer, the term of this patent is extended or adjusted under 35 U.S.C. 154(b) by 0 days.

(21) Appl. No.: 18/552,442

(22) PCT Filed: Mar. 29, 2022

(86) PCT No.: PCT/SE2022/050306
§ 371 (c)(1),
(2) Date: Sep. 26, 2023

(87) PCT Pub. No.: WO2022/211709
PCT Pub. Date: Oct. 6, 2022

(65) Prior Publication Data
US 2024/0091887 A1    Mar. 21, 2024

(30) Foreign Application Priority Data
Mar. 29, 2021   (SE) .................. 2150379-2

(51) Int. Cl.
*B23K 35/22*    (2006.01)
*B23K 35/30*    (2006.01)
(Continued)

(52) U.S. Cl.
CPC ........ *B23K 35/3066* (2013.01); *C22C 38/001* (2013.01); *C22C 38/005* (2013.01);
(Continued)

(58) Field of Classification Search
None
See application file for complete search history.

(56) References Cited

U.S. PATENT DOCUMENTS

| 4,102,225 A | 7/1978 | Michels |
| 2004/0191109 A1* | 9/2004 | Maziasz ............... C22C 38/001 420/45 |
| 2008/0163957 A1* | 7/2008 | Brady .................... C22C 38/04 148/326 |

FOREIGN PATENT DOCUMENTS

| CN | 107587080 A | 1/2018 |
| EP | 0459547 A1 | 12/1991 |

(Continued)

OTHER PUBLICATIONS

Design of alumina-forming austenitic stainless steel using genetic algorithms Taymaz Jozaghi, Chung Wang, Raymundo Arroyave, Ibrahim Karaman Materials and Design 186 (2020)108198) (Year: 2020).*

(Continued)

*Primary Examiner* — Jenny R Wu
(74) *Attorney, Agent, or Firm* — KARCESKI IP LAW, PLLC

(57) ABSTRACT

A steek suitable for structural components used in contact with liquid lead or liquid lead alloys in nuclear reactors consisting of in weight % (wt. %): C 0.02-0.09; Si 0.1-1.6; Mn 1.5-3.0; Cr 9.0-12.0; Ni 10.0-16.8; Al 2.0-3.4; Ti 0.1-1.0; Nb≤0.5; V≤0.5; Ta≤1.5; Y≤0.5; Mo≤1.5; W≤1.5; Cu≤1.7; N≤0.06; Co≤1.0; B≤0.1; Zr≤0.5; Hf≤0.5; RE≤0.2; Ca≤0.1; Mg≤0.1; Bi≤0.1; SE≤0.1 and balance Fe apart from impurities, wherein the content of RE does not include the amount of Y but only the amount of the elements having an atomic numbers 21 and 57-71, wherein the steel fulfils one or more of the following requirements:
$Cr_{Eq}$=18.5-21 and $Ni_{Eq}$=11-20 wherein $Cr_{Eq}$=Cr+3Al+2Si+1.5[(Ti+Nb+V+Ta+Zr)−4.5(C+N)] and $Ni_{Eq}$=Ni+0.5((Mn+Cu+Co). 5-25 volume % delta ferrite.

11 Claims, 8 Drawing Sheets

(51) Int. Cl.

| | |
|---|---|
| *C22C 38/00* | (2006.01) |
| *C22C 38/02* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C22C 38/58* | (2006.01) |

(52) U.S. Cl.
CPC .............. *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01)

(56) References Cited

FOREIGN PATENT DOCUMENTS

| | | |
|---|---|---|
| EP | 3194633 A1 | 7/2017 |
| JP | H03236449 A | 10/1991 |

OTHER PUBLICATIONS

Role of Delta Ferrite in Austenitic Stainless steel weld (Year: 2015).*

Alumina Forming Austenitic Alloys Resist High Temperature Corrosion, Riggs Larsen, K., Apr. 5, 2020, Materials Selection & Design (/topics/materials-selection-design), www.materialsperformance.com.

International Search report & Written Opinion dated Apr. 14, 2022, Swedish Patent Office, Stockholm, Sweden.

Müller, G. et al., "Investigation on oxygen controlled liquid lead corrosion of surface treated steels", Journal of Nuclear Materials 278(2000) 85-95.

* cited by examiner

OVERLAY WELDING MATERIAL

A steel for overlay welding material suitable for structural components used in contact with liquid lead or liquid lead alloys in nuclear reactors.

Alumina forming steels like FeCrAl are often superior to chromia forming stainless steels concerning oxidation and corrosion in many high temperature environments. FeCrAl-steels have weak high temperature mechanical properties but can be used as weld overlay on load bearing steels. However, it has been shown that a welded FeCrAl structure is not ductile and can easily crack upon welding or cooling. This is a serious problem that cannot be circumvented when a construction must follow a pressure vessel code and/or a bend test code.

Theoretically, one solution could be to use a high aluminum alloyed austenitic steels or nickel base alloy as weld overlay (or as a mono material) but that would be very expensive and it would not work in certain environments that demand quite low nickel content, such as liquid lead or lead-bismuth eutectic (LBE) environments.

The current invention has a cost-effective solution to this problem. By using a modified and lean AFA (Alumina Forming Austenite) composition it is possible to produce a ductile and corrosion resistant weld overlay. By using the inventive weld overlay on a standard stainless steel that is accepted for pressure vessels as a substrate, it is possible to solve severe high temperature corrosion problems.

AFA-compositions have been promising as corrosion and creep resistant steels for more than 10 years but have not reached the market due to formability and ageing problems under certain circumstances. Both issues are connected to loss of ductility.

WO20167039679A1 discloses an AFA alloy suitable for use in contact with liquid lead.

Ever since the early works carried out at the Oak Ridge National Laboratory (ORNL), the presence of Nb has been reported as a necessity for alumina formation in AFA steels and high amounts of austenite stabilizing elements, preferably Ni but also Cu and Mn has been added in addition to Ni in order to obtain a single phase stable and highly uniform austenitic microstructure, avoiding a ferritic-austenitic dual phase structure. A review of earlier work on AFA alloys has been given by K. R: Larsen in Materials Performance, 54(9):30-34. The content of which is available under the following links:

https://www.researchgate.net/publication/283690362_Alumina-forming_austenitic_alloys_resist_high-temperature_corrosion and http://www.materialsperformance.com/articles/material-selection-design/2015/12/alumina-forming-austenitic-alloys-resist-high-temperature-corrosion In the section "Fine-Tuning the Alloy Composition" three requirements for AFA alloys are listed. Firstly, the presence of 12 to 15% Cr and 2.5 to 4% Al. Secondly, the addition of 0.6 to 3% Nb and thirdly, that the amounts of N, Ti and V generally must be minimized.

The present inventors have surprisingly found that it is possible to produced AFA-alloys having good properties for use in contact with liquid lead or lead based alloys even if one does not adhere to all three requirements set out above.

The current invention uses a fine-tuned lean AFA-composition in which the content of Cr can be less than 12% and wherein Nb need not be deliberately added, provided that the alloy comprises 0.1-1.0% Ti. It has also been found that a certain amount of ferrite not only can be tolerated but that the dual phase structure may have a positive influence on the properties. However, the amount of ferrite should be restricted to 5 to 25 vol. %. A preferred amount is 10-25 vol. % ferrite in the welded structure. This gives important benefits in terms of improved weldability (avoid hot cracking) and improved corrosion resistance (increased Al-diffusion) with maintained ductility during long term ageing.

A "conventional" AFA-steel with 98-100% austenite and with a composition close to this invention are more prone to metal dissolution in liquid lead and have less oxidation resistance in steam.

However, the ferrite content should not exceed 25 vol. % in order to avoid a continuous network of ferrite and thereby a reduced ductility and secondary brittle phases as well as to avoid liquid metal embrittlement (LME) in liquid lead and lead bismuth eutectic (LBE) alloys.

This inventive welding consumable/weld overlay could be applied on several components in a lead cooled reactor, such as the inner side of the vessel, pump components, steam generator components, core barrel and other components in the core structure where corrosion protection with kept ductility is required.

The oxidation resistance exceeds the conventional stainless steels like AISI 316L by far, especially in liquid lead/LBE but also in steam.

The inventive lean welding consumable/weld overlay have the unique combination of good welding-, casting-, corrosion-, erosion- and high temperature mechanical properties as well as LME-resistance with maintained ductility and cost competitiveness.

The welding consumable can be either wire or strip and the welding methods may be TIG, MIG, Laser welding or weld overlay processes used in heavy industry including different Arc Welding technologies, SAW (with wire or strip), SMAW (with wire), GMAW (with wire), FCAW (with wire) and electro slag welding, ESW, (with strip).

The most important feature of the invention being that the weld overlay qualifies according to the requirements in pressure vessel codes for standard bend test concerning corrosion protective surface layers.

The last term in the Cr-equivalent is the sum of all Strong Carbide Formers (SCF) such as Ti, Nb, Ta, V and Zr, in a free non-carbide/nitride form, i.e. with the amount of carbon and nitrogen subtracted.

Figure 1:
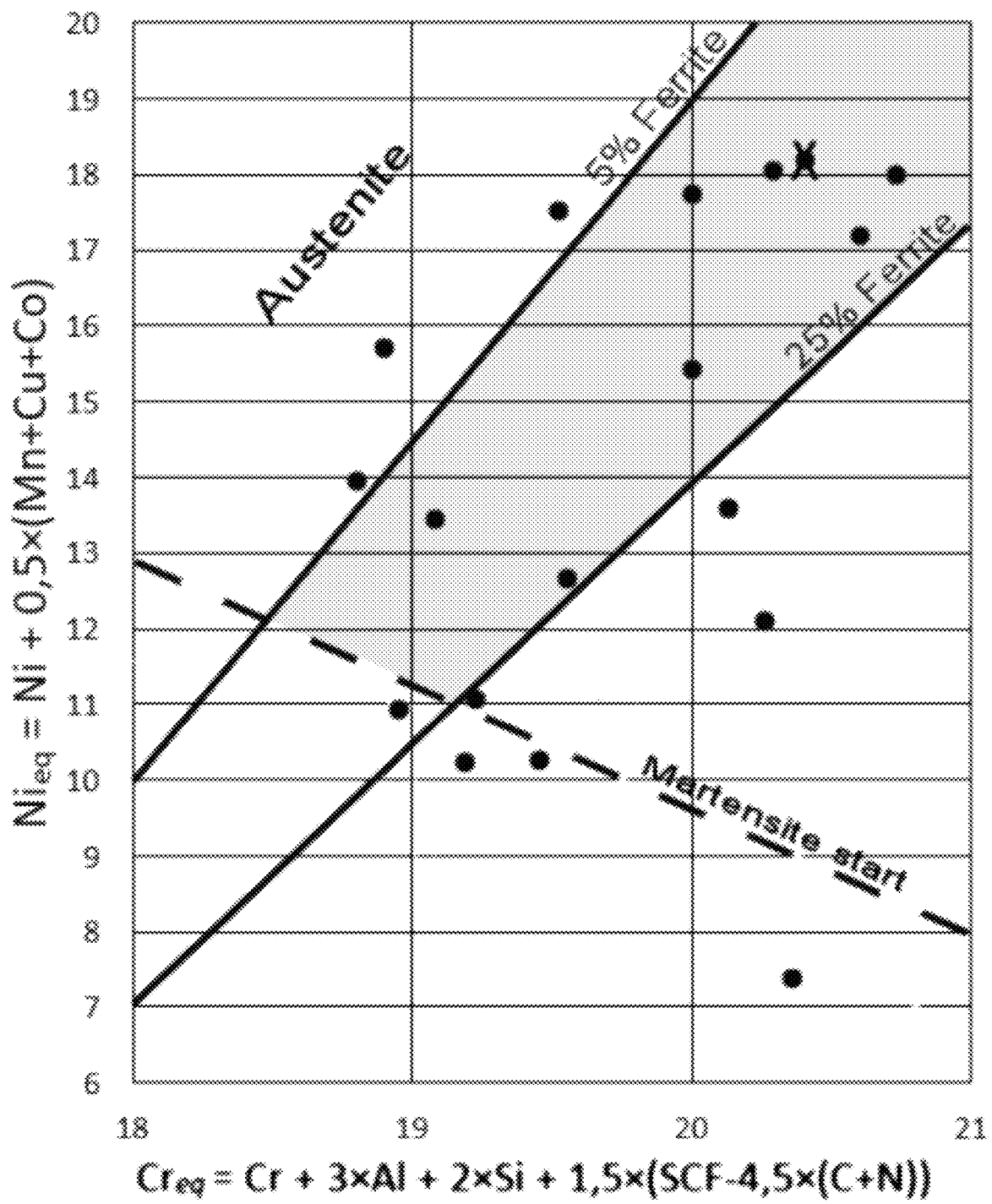
FIG. 1. Schaeffler diagram for AFA-steels 5-25% ferrite is marked in grey.
Figure 2:
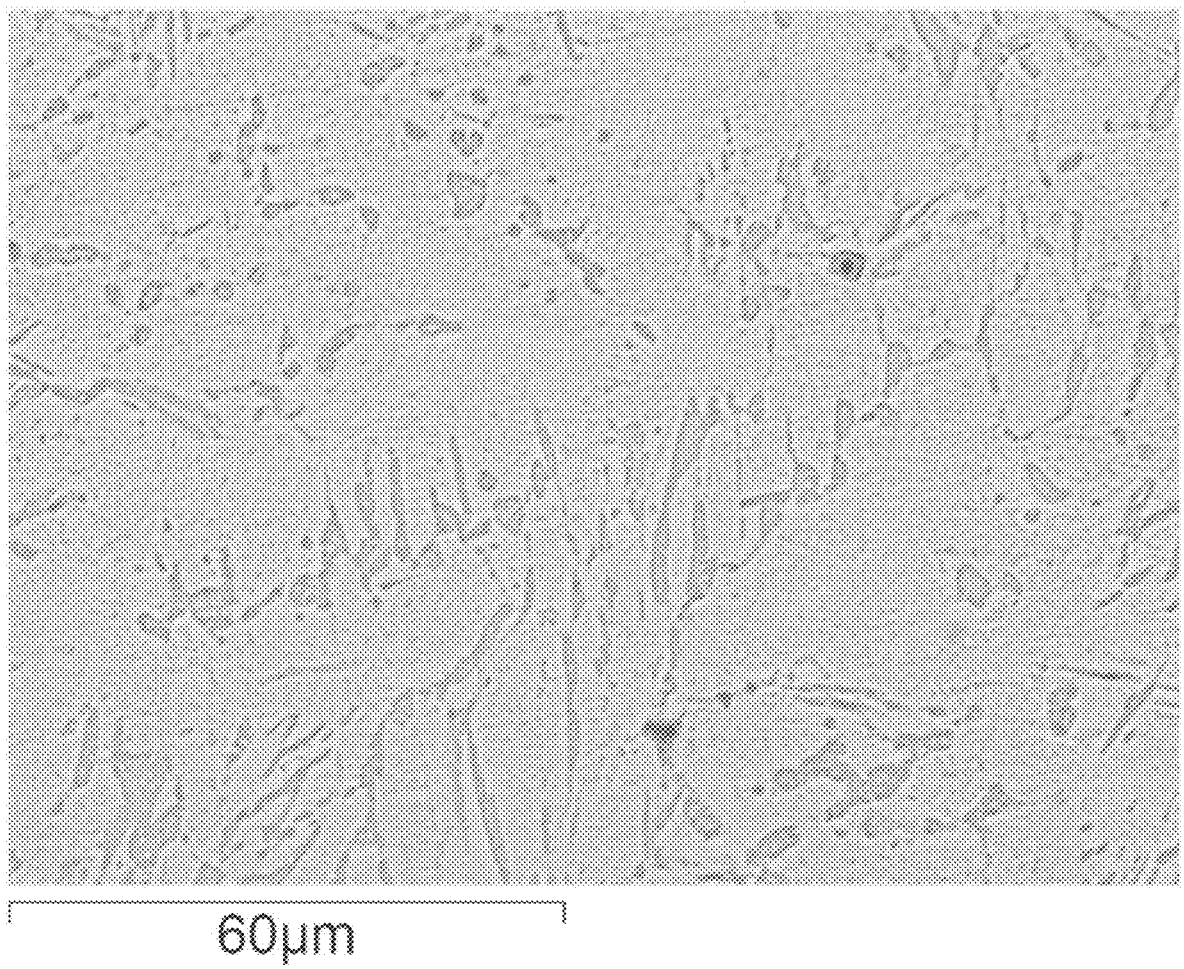

FIG. 2. Example of the welded structure of the inventive steel marked with an X in FIG. 1. Typical welded structure of the inventive alloy with 17% ferrite and 87% austenite.

Figure 3:
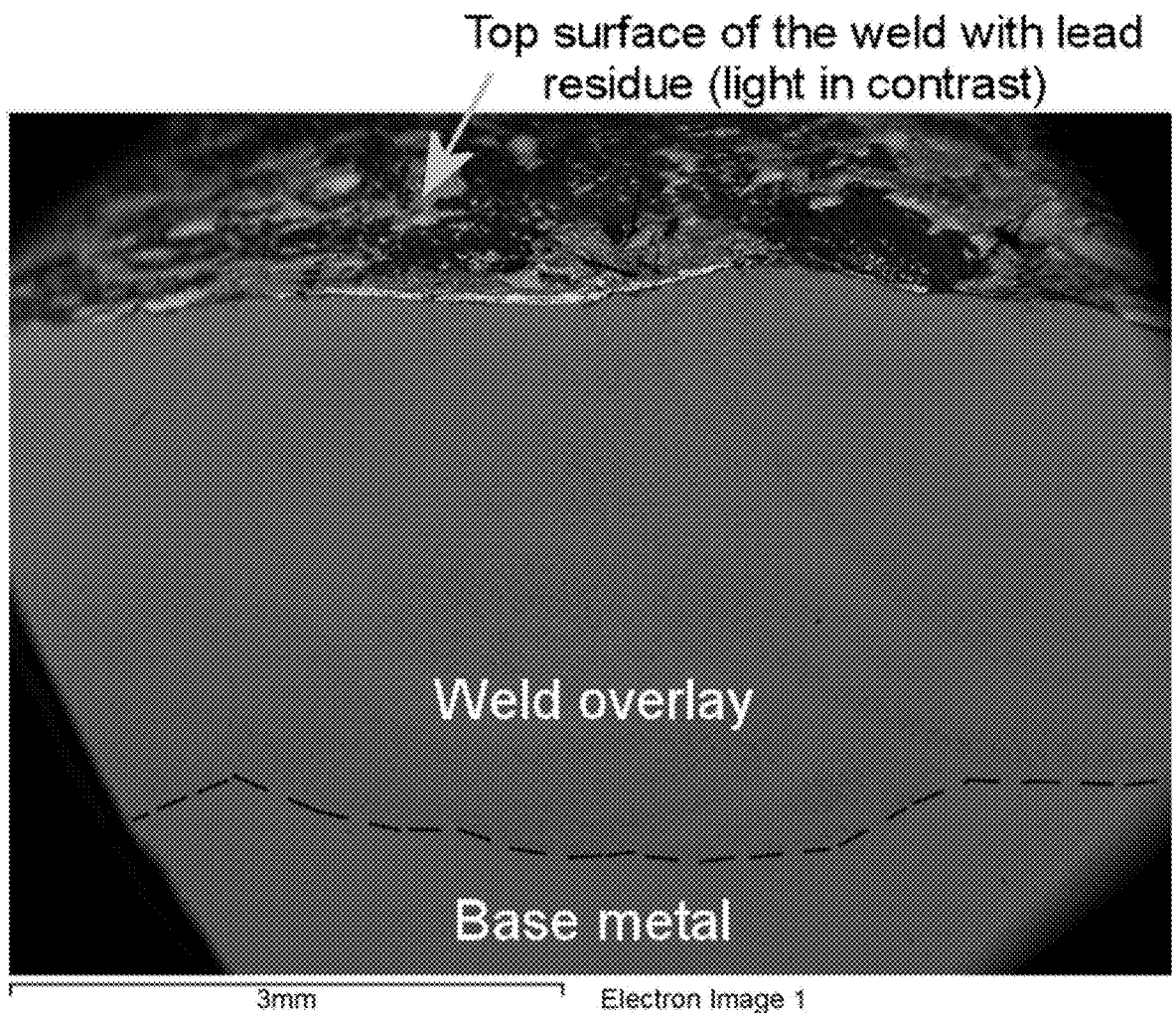

FIG. 3. Electron microscope (SEM) cross-section of the inventive steel as weld overlay on AISI 316L base metal (substrate) exposed in liquid lead at 700° C. The inventive steel consumable is marked with an X in FIG. 1. The top surface (weld) with residual lead has formed a protective oxide.

Figure 4:
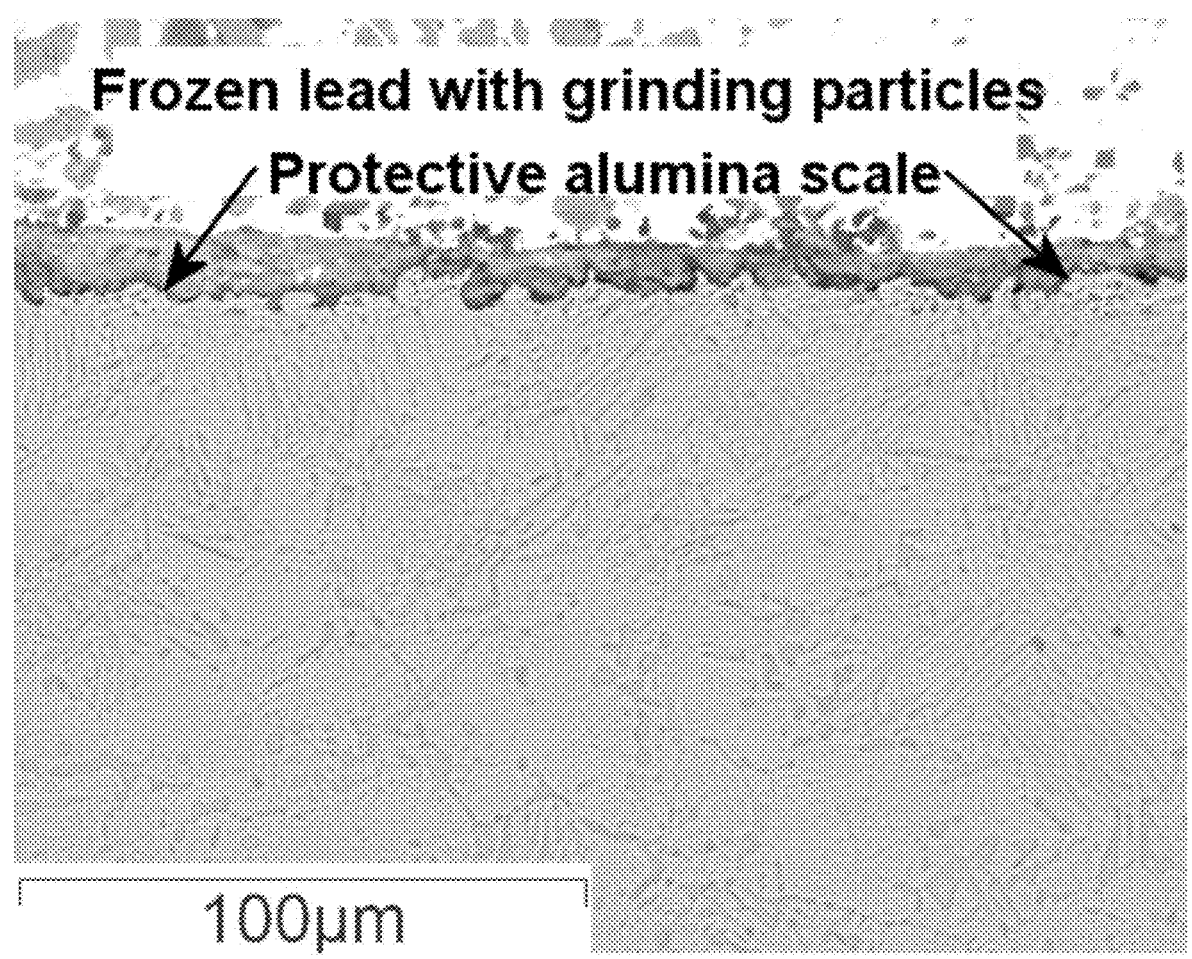

FIG. 4. Same cross-section as in FIG. 3 but in higher magnification. The inventive weld overlay has formed a fully protective aluminium rich oxide underneath the original weld oxide. The aluminium content measured by EDX (not shown here) indicate up to 10 weight-% aluminium at the inner protective oxide layer, i.e. the real Al-content is much higher since the layer is only around one micrometre thick.

Figure 5:
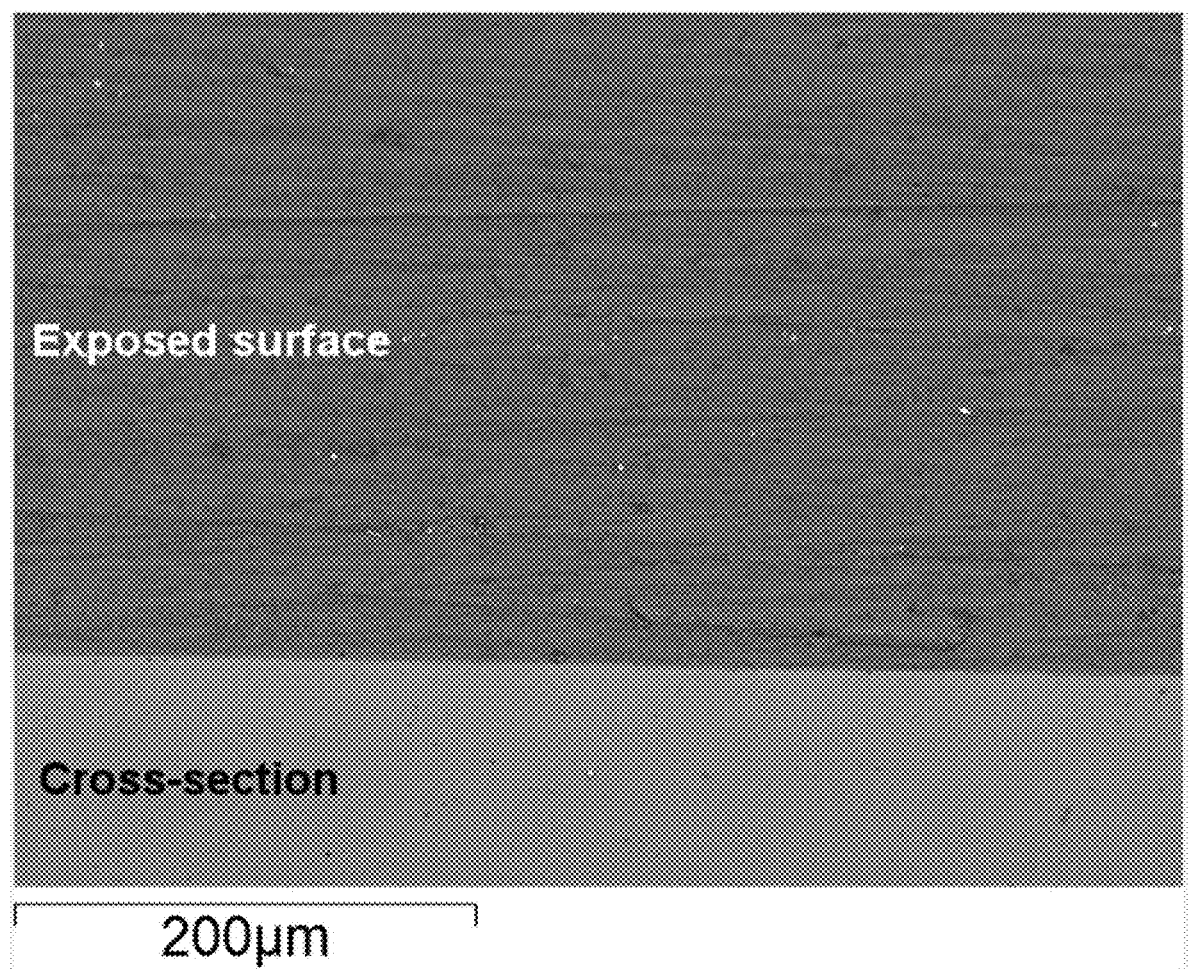

FIG. 5. SEM-micrograph showing the inventive steel in as cast condition exposed to steam for 700 h @ 700° C. Polished cross-section and exposed surface which was grinded with SiC-paper 600 #before exposure. Thin protective Al-rich oxide with no visible corrosion attack.

Figure 6:
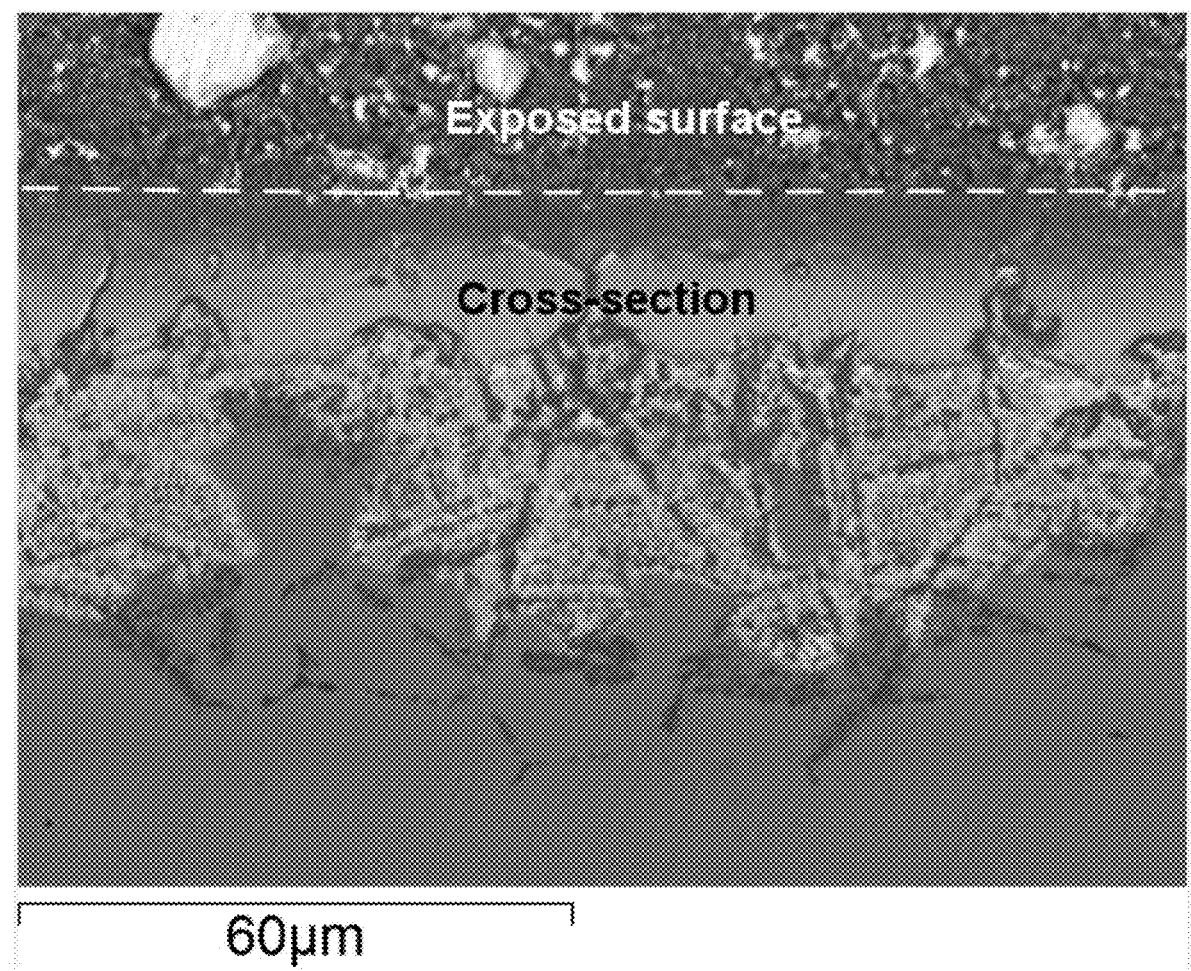

FIG. 6. SEM-micrograph showing the commercial AISI 316L steel exposed to lead for 700 h @ 700° C. Polished cross-section and exposed surface. Severe corrosion with nickel dissolution, lead penetration (light grey in contrast) and internal oxidation (dark in contrast), especially in the grain boundaries.

Figure 7:
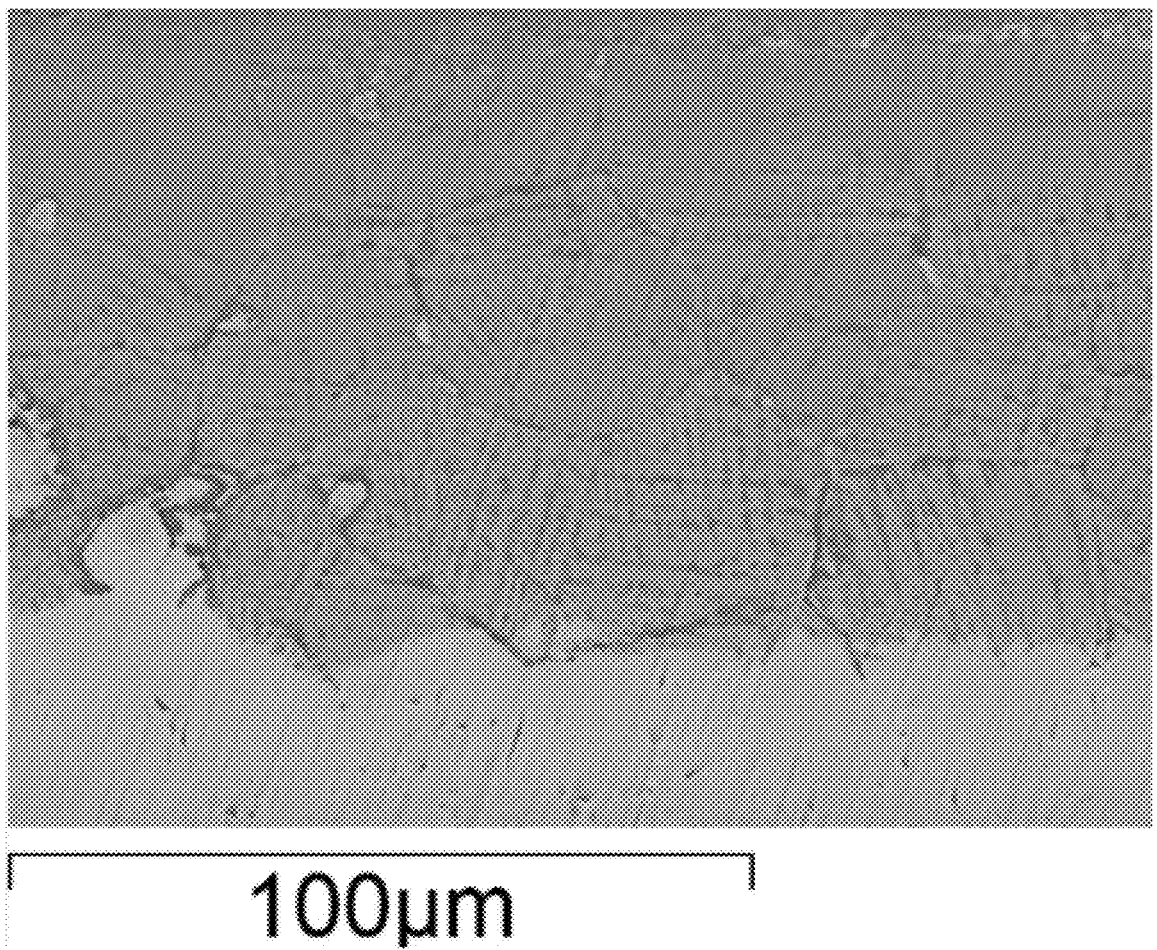

FIG. 7. SEM-micrograph showing the commercial AISI 316L steel exposed to steam for 700 h @ 700° C. Polished cross-section. Severe oxidation, up to 100 micrometre in depth.

Figure 8:
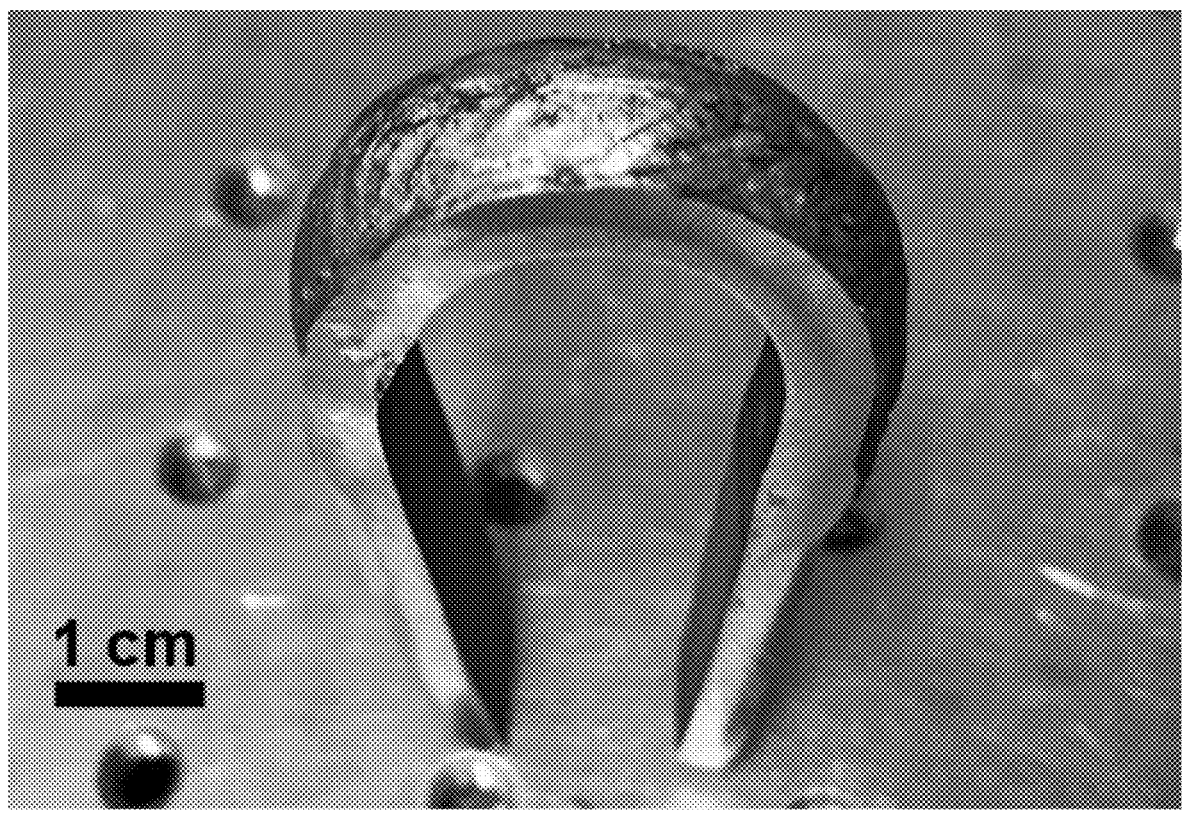

FIG. 8. Example of bend test of weld overlay based on the inventive steel on a AISI 316L substrate.

DETAILED DESCRIPTION

The importance of the separate elements and their interaction with each other as well as the limitations of the chemical ingredients of the claimed alloy are briefly explained in the following. All percentages for the chemical composition of the steel are given in weight % (wt. %) throughout the description. Upper and lower limits of the individual elements can be freely combined within the limits set out in the claims.

9.0-12.0% Chromium is to be present in a content of at least 9% to provide a good oxidation and corrosion resistance. Cr is a ferrite stabilizing element, which reacts with carbon to form carbides. Cr also favours protective alumina scale formation by the so-called "third-element effect". However, the chromium content should not exceed 12% since the amount of ferrite in the weld must be minimized to maximum 25%.

Too much ferrite in the weld makes it less ductile and it may fail standard bend tests and formation of undesired brittle phases increases during ageing at lower temperatures, i.e., 400-600° C. The chromium content is therefore limited to 12%. The lower limit may be 9.0% 9.5%, 10.0%, 10.5% or 11.0%. The upper limit may be 11%, 11.5% or 12.0%

10-16.8% Nickel is an austenite stabilizer and its primary purpose is to stabilize the austenitic phase. To get a ductile welded structure it is important to keep the amount of ferrite lower than 25%, thus the Ni content should be higher than 10%. To reach a balanced structure with optimised corrosion properties, the nickel content should not be higher than 16.8%. Especially the risk for nickel dissolution corrosion in the weld increases sharply in liquid lead/LBE if the nickel content exceeds 16.8%.

The lower limit may therefore be 10.0%, 10.5% or 11.0% and the upper limit may be 12.0%, 12.5%, 13.0%, 13.5% 14.0%, 14.5%, 15.0%, 15.5%, 16.0, or 16.5%.

2.0-3.4 Aluminum is essential for the formation of the Al-rich oxides and is therefore added in an amount of 2.0-3.4%. However, too much Al may result in the formation of undesired brittle phases. Aluminium stabilizes ferrite and must be balanced with austenite stabilizers to avoid too much ferrite. The lower limit may therefore be 2.1%, 2.2%, 2.3 or 2.4% and the upper limit may be 3.1%, 3.2% or 3.3%.

Carbon is always present in steels, it forms carbides and stabilizes the austenite. C, i.e. carbides, are also important to minimize the grain growth upon cooling from melting temperatures in the weld. The upper limit for carbon may be set 0.09%, 0.08%, 0.07%, 0.06% or 0.05%. The lower limit may be as low as 0.02% depending on the boron and nitrogen contents.

Nitrogen may be present in the steel in an amount of ≤0.06% because N reacts with Al. N may also form precipitates with Nb, Ti, Zr, V and Y and is beneficial for strength and creep resistance.

Molybdenum and Tungsten increases the high temperature mechanical properties and are carbide forming elements and also strong ferrite formers and may result in the formation of brittle Laves phase. Addition of W and Mo increases the creep properties. The amount of molybdenum and tungsten should each be restricted to maximum 1.5%, preferably to 1% or less. The lower limit may each be 0.001, 0.005, 0.01, 0.05, or 0.1%. If the alloy composition is prone to lave phase precipitation and ferrite formation, the higher limit may be 0.5% or 0.1

Niobium is an element that form carbides, nitrides and carbo-nitrides and is beneficial for strength and creep resistance. In addition, Nb tends to improve the oxidation resistance in the same way as RE (Reactive Element). Nb need not be added but may be present, in an amount of up to 0.5%. Preferably, the upper limit may be set to 0.4% 0.3%, 0.2%, 0.1% or 0.05%. The lower limit may be 0.001, 0.005, 0.01, 0.05, or 0.1%.

Tantalum form carbides, nitrides and carbo-nitrides and is beneficial for strength and creep resistance. In addition, Ta tends to improve the oxidation resistance in the same way as RE (Reactive Element). Ta is therefore present, individually, in an amount of up to 1.5%. The lower limit may be 0.001, 0.005, 0.01, 0.05, or 0.1%.

Titanium

Ti is deliberately added to the present alloy in an amount of 0.1-1%, preferably 0.2-0.9%, more preferably 0.3-0.9%. Ti favours the formation of a stable alumina layer and act as a grain refiner.

Zr

Is a reactive element that promote formation of a protective alumina scale. Strong carbide formers and strong oxide particles formers, beneficial for high temperature mechanical properties. The amount of Zr may be up to 0.5%. If higher, hot ductility may be negatively affected. The upper limit may further be restricted 0.4, 0.3. 0.2, or 0.1%. The lower limit may be 0.01%.

Hf

Is a reactive element that promote formation of a protective alumina scale. Strong carbide formers and strong oxide particles formers, beneficial for high temperature mechanical properties. The amount of Hf may be up to 0.5%. The upper limit may further be restricted 0.4, 0.3. 0.2, or 0.1%. In nuclear applications the amount of hafnium is preferably lower than 0.01%.

Yttrium

Reactive elements that promote formation of a protective alumina scale. It may be included in carbides and nitrides. It is a strong oxide particle former, beneficial for high temperature mechanical properties.

The amount of Y may be up to 0.5%. The upper limit may be ≤0.3% since higher amount may induce hot-cracking in austenite. The upper limit may further beet to 0.2%, 0.1%, 0.055 or 0.03%. If added, the lower limit may be 0.001, 0.01, 0.05, or 0.1%.

Silicon is beneficial for high temperature oxidation properties but stabilizes ferrite and forms brittle phases and in higher content and should thus be limited. The upper limit is 1.6% and may be set to 1.2%, 1.0%, 0.9%, 0.8%, 0.5% or 0.3%. The lower limit may be set to 0.2%, 0.3% or 0.4%.

Manganese

Austenite stabilizer and may to some extent replace Ni. Mn is present in an amount of 1.5 to 3.0%. Mn also improves the mechanical properties to some extent. Mn is included in carbides as well as oxides. Mn tends to promote secondary phases, such as sigma phase, which may cause embrittlement. The oxidation properties may be affected negatively at higher concentrations. The upper limit may be 3%, 2.9%, 2.8%, 2.7% or 2.6%. The lower limit may be 1.5%, 1.6%, 1.7%, 1.8%, 1.9%, 2.0%2.1%, 2.2%, 2.3% or 2.4%. However, according to a conceivable alternative, Mn need not be deliberately added provided that the requirements $Cr_{Eq}$=18.5-21 and $Ni_{Eq}$=11-20 are fulfilled.

Copper is an optional element, which has an austenite stabilizing effect, but it may form brittle phases, especially under irradiation. It is not possible to extract copper from the steel once it has been added. This drastically makes the scrap handling more difficult. For this reason, copper is normally limited to 1.7%, preferably ≤1%.

If added, the lower limit may be 0.1, 0.2, 0.3, 0.4, or 0.5%. The upper limit may be 1.7%, 1.5%, 1.3%, or 1%.

Cobalt

The Co-content should be as low as possible in nuclear applications but for other application it is beneficial in stabilizing an austenitic structure and improves the strength at all temperatures. In compositions aimed for nuclear applications, the amount is preferably ≤0.1%. In compositions where Co is deliberately added, the amount may be ≤1%.

Vanadium forms carbides and carbonitrides of the type M(C,N) and Z-phase in the matrix of the steel. However, the V amount should be ≤0.5%. The lower limit may be 0.01, 0.05, 0.1, or 0.15%.

Sulphur

Sulphur should not deliberately be added, lowers the oxidation properties.

Boron

Boron may act as a substitution to carbon but is also a strong neutron absorber. Boron may increase the creep strength in martensitic steels by reducing the coarsening of carbides at higher temperatures. Boron suppresses the nucleation of ferrite on austenitic grain boundaries. The amount of B may be ≤0.1%, but preferably ≤0.01% depending on the carbon content.

Bi, Se

These elements may be added to the steel in the claimed amounts in order to further improve the machinability, hot workability and/or weldability. Maximum amount of each element is preferably less than 0.1%, more preferably less than 0.02%. Preferably neither is deliberately added since they may impair corrosion resistance.

Ca, Mg

These elements may be added to the steel in the claimed amounts in order to further improve the machinability, hot workability and/or weldability. Maximum amount of each element is preferably less than 0.1%, more preferably less than 0.02%.

Oxygen

O is not deliberately added. The amount of 0 is preferably less than 0.05%.

RE (Reactive elements) Improves the oxide scale properties and are beneficial for high temperature mechanical properties. RE as used in this application embraces the elements with atomic numbers 21 and 57-71 because Yttrium is defined separately. The amount of RE may be ≤0.2%. The lower limit may be 0.001, 0.005, 0.01, 0.05, or 0.1%. For instance, Lanthanum may be added in the range of 0.001-0.2%, or 0.01-0.1%.

The steel preferably having 5-25 volume-% ferrite and structure in a matrix of austenite. A specialized Schaeffler diagram for AFA-steels and the inventive welding consumable compositions has been constructed based on experimental data. The composition ranges in terms of Cr and Ni equivalents ($Cr_{Eq}$; $Ni_{Eq}$) for the inventive welding consumable shown in FIG. 1.

Preferably the Cr and Ni equivalents ($Cr_{Eq}$; $Ni_{Eq}$) fulfils: $Cr_{Eq}$=18.5-21 and $Ni_{Eq}$=11-20 wherein $Cr_{Eq}$=Cr+3Al+2Si+1.5[(Ti+Nb+V+Ta+Zr)−4.5(C+N)] and $Ni_{Eq}$=Ni+0.5(Mn+Cu+Co).

This inventive steel can be used as weld overlay on preferably austenitic substrate materials such as AISI 316L and Alloy 800HT.

An example of the inventive weld overlay structure on a 316L substrate is shown in FIG. 2. The amount of delta-ferrite is 17% in this example, which improves the weldability without compromising the inherent austenitic phase immunity to Liquid Metal Embrittlement (LME).

As previously mentioned, the preferred amount of delta-ferrite in the final weld overlay structure is 5-25%. The upper limit of delta-ferrite may further be restricted to 23%, 21%, 19%, 17% or 15%. The lower limit may further be restricted to 6%, 7%, 8%, 9%, or 10%. A preferred range may be 10-20%.

Then amount of intermetallic phases are preferably less than 5 vol %, preferably less than 1%, most preferably the steel is void of intermetallic phases. Examples of intermetallic phases are sigma, laves, and chi.

Applications

The steel can be used as weld overlay material in a nuclear reactor or in concentrated solar power plant. In particular, a nuclear reactor or a concentrated solar power plant that is cooled by a lead or lead-bismuth alloy. In such applications the molten lead or lead-bismuth alloy may have a temperature of ≤600° C. and/or an oxygen content of at least $10^{-7}$ wt. %.

A nuclear pressure vessel may comprise the steel.

The steel can be in the form of a strip or a wire and can be used as a welding consumable and/or a weld overlay material.

A compound material can be formed by a substrate of stainless steel on to which the inventive steel defined above is provided by overlay welding. The substrate material can be a steel selected form the group AISI 316, AISI 316L, AISI 316 LN, ALLOY 800 or ALLOY 800HT. Preferably, the weld overlay comprises 5 to 25 vol. % ferrite, more preferably 10 to 20 vol. % ferrite.

Examples

In the present examples, the invention, both as welding consumable and weld overlay are compared with the commercial stainless steel, AISI 316L.

The eleven inventive steel compositions disclosed in Table 1a were selected from a larger experimental steel matrix of 42 different compositions. All steels were casted in a high frequency induction furnace, approximately 100 g per batch. The twelve selected steels were cast directly into 3.5 mm thin rectangular plates, approximately 200×20 mm. Small samples of as cast material (approx. 30×4×3.5 mm³) were cut out for corrosion and erosion tests.

The plates were cut by wire discharge machining (WEDM) into 200 mm long ribbons, 3.5×1.5 mm in cross-section, which was used as welding consumables. A 4 mm thick plate made of stainless AISI 316L was used as substrate for the different weld overlays. Manual TIG welding 100A DC was used.

The compositions of the selected alloys are shown in Table 1a. The corresponding chromium equivalents ($Cr_{eq}$) and nickel equivalents ($Ni_{eq}$) are disclosed in Table 1b.

TABLE 1a

Elemental compositions of the 11 best alloys (1-11) concerning weldability, corrosion properties and ductility. All values are given in wt-%. AISI 316L is the substrate material for the weld overlay tests. All welded samples contain approximately 5-25% delta-ferrite.

| Alloy | Al | Cr | Ni | C | N | Mn | Cu | Si | Ti | V | Nb | Mo/W/Ta | Other |
|---|---|---|---|---|---|---|---|---|---|---|---|---|---|
| AISI 316L | | 17 | 10 | 0.02 | | 1 | 0.4 | 0.5 | | | | Mo = 2 | |
| 1 | 2.4 | 11.8 | 16.3 | 0.037 | 0.006 | 2.5 | 1 | 0.32 | 0.63 | 0.001 | 0.001 | | La = 0.015 |
| 2 | 3 | 9 | 11.5 | 0.07 | 0.006 | 2.3 | 0.01 | 0.65 | 0.35 | 0.16 | 0.049 | | Zr = 0.04 |
| 3 | 2.9 | 10 | 12.4 | 0.07 | 0.07 | 2.1 | 0.01 | 0.29 | 0.36 | 0.19 | 0.035 | | Zr = 0.02 |
| 4 | 2.9 | 10.2 | 14.3 | 0.072 | 0.003 | 2.2 | 0.01 | 0.37 | 0.37 | 0.21 | 0.028 | | Zr = 0.05 |
| 5 | 2.6 | 10.3 | 16.7 | 0.05 | 0.004 | 2.1 | 0.01 | 0.83 | 0.3 | 0.2 | 0.034 | | B = 0.012 |
| 6 | 3.2 | 10.2 | 15.7 | 0.07 | 0.008 | 2.3 | 0.7 | 0.3 | 0.3 | 0.15 | 0.04 | | La = 0.022 |
| 7 | 2.5 | 11.2 | 16.2 | 0.038 | 0.009 | 2.6 | 1 | 0.26 | 0.81 | 0.006 | 0.001 | | Y = 0.012 |
| 8 | 2.6 | 11.8 | 16.2 | 0.036 | 0.009 | 2.6 | 0.95 | 0.26 | 0.2 | 0.006 | 0.001 | Mo = 0.7 | Y = 0.01 Z = 0.02 |
| 9 | 2.6 | 11.9 | 16.2 | 0.044 | 0.009 | 2.6 | 0.98 | 0.26 | 0.2 | 0.006 | 0.001 | W = 0.94 | Y = 0.014 |
| 10 | 2.5 | 11 | 16.2 | 0.052 | 0.009 | 2.6 | 1.1 | 0.26 | 0.2 | 0.006 | 0.001 | Ta = 0.9 | Y = 0.09 |
| 11 | 2.6 | 11.6 | 16.4 | 0.046 | 0.006 | 2.6 | 0.96 | 0.14 | 0.63 | 0.084 | 0.22 | | Zr = 0.03 |

TABLE 1b

Cr- and Ni- equivalents optimised for lean AFA's with small amounts of delta ferrite. $Cr_{eq} = Cr + 3Al + 2Si + 1.5(SCF-4.5(C + N))$. SCF are the sum of strong carbide formers such as Ti, Nb, Ta, V, and Zr. $Ni_{eq} = Ni + 0.5(Mn + Cu + Co)$, all values in weight-%.

| Alloy | Cr-eq | Ni-eq |
|---|---|---|
| 1 | 20.3 | 18.1 |
| 2 | 19.6 | 12.7 |
| 3 | 19.2 | 13.5 |
| 4 | 20.0 | 15.4 |
| 5 | 20.1 | 17.8 |
| 6 | 20.7 | 17.2 |
| 7 | 20.1 | 18.0 |
| 8 | 20.1 | 18.0 |
| 9 | 20.2 | 18.0 |
| 10 | 18.9 | 18.1 |
| 11 | 20.7 | 18.2 |

The cast samples were grinded and polished to remove any initial oxides using Struers abrasive SiC paper (final step #500) and finally cleaned in ethanol and deionised $H_2O$. The weld overlay samples were exposed as welded with remaining weld oxides.

The corrosion experiment was conducted in a COSTA (COrrosion Test Stand for liquid metal Alloys) setup, constructed by Karlsruhe Institute of Technology (KIT). Samples were fitted into alumina crucibles using alumina holders as support and then filled with lead. All crucibles were subsequently placed on nickel trays and placed inside the sealed quartz tubes of the furnace. More information on the COSTA setup is presented in J. Nucl. Mater. 278(2000) 85-95.

Two environmental conditions were chosen, using lead as liquid metal as one condition and the other exposure using steam. The oxygen concentration in the liquid lead was controlled by means a gas mixture containing Ar, $H_2$ and $H_2O$. The $H_2/H_2O$ ratio was set to approximately $10^{-3}$, which corresponds to $10^{-5}$ weight-% oxygen dissolved in the lead at the exposure temperature, 700° C. The exposure time was 700 h. A ZIROX SGM5 oxygen analyser was used to monitor the oxygen partial pressure at the systems gas outlet. The steam exposure was as well performed at 700° C. for 700 h. Inert Ar-gas was added to stabilise the gas flow in the furnace during the steam exposure. After exposure, cross sections were prepared by polishing one side with approximately a 45° of each sample to a final step of #4000. The samples were then cleaned with ethanol and deionised $H_2O$, followed with drying using pressurized air. Representative example of results from the liquid lead and steam exposures can be seen in FIG. 3-7 and a summary of the results is sown in Table 2. All as cast and polished samples behaved as god as or better than the welded overlay of the same material which is expected since the weld overlay is slightly diluted or mixed with the AISI 316L-base material, typically 5-10%, measured on the top of the weld overlay.

TABLE 2

Summary of the result from liquid lead and steam exposures @ 700° C.

| | Liquid Lead | | Steam | |
|---|---|---|---|---|
| Alloy | P.O | I.O. | P.O. | I.O. |
| AISI 316L | No | 60 μm | No | 90 μm |
| Inventive steels | Yes | No | Yes | No |

P.O.—Protective oxide,
I.O.—Internal Oxidation/Corrosion.

All weld overlay samples on AISI 316L-substrate passed the bend test without any signs of crack initiation, one example of such test sample is shown in FIG. 8. The three-point bend test radius was smaller than required by the ASME bend test code and the bend-test angle was larger than required, i.e., larger than 180°.

The invention claimed is:
1. A steel for overlay welding, suitable for structural components used in contact with liquid lead or liquid lead alloys in nuclear reactors, the steel consists of in weight % (wt. %):

C 0.02-0.09
Si 0.1-1.6
Mn 1.5-3.0
Cr 9.0-11.9
Ni 10.0-16.8

Al 2.0-3.4
Ti 0.1-1.0
Optionally Nb≤0.5
V≤0.5
Ta≤1.5
Y≤0.5
Mo≤0.7
W≤1.5
Cu≤1.7
N≤0.06
Co≤1.0
B≤0.1
Zr≤0.5
Hf≤0.5
RE≤0.2
Ca≤0.1
Mg≤0.1
Bi≤0.1
Se≤0.1 balance Fe apart from impurities, wherein the content of RE does not include the amount of Y but only the amount of the elements having an atomic numbers 21 and 57-71, and wherein the steel fulfils the following requirements a) $Cr_{Eq}$=18.5-21 and $Ni_{eq}$=11-20 wherein $Cr_{Eq}$=Cr+3Al+2Si+1.5[(Ti+Nb+V+Ta+Zr)−4.5 (C+N)] and $Ni_{eq}$=Ni+0.5 ((Mn+Cu+Co), and b) the steel comprises 5-25 volume % delta ferrite.

2. The steel according to claim 1, wherein a composition of the steel is balanced such that it falls within the area defined by the coordinates:

| $Ni_{Eq}$ | $Cr_{Eq}$ |
|---|---|
| 11.0 | 19.2 |
| 12.1 | 18.5 |
| 20 | 20.1 |
| 20 | 21 |
| 17.2 | 21 | wherein the $Ni_{Eq}$ is represented on the y-axis and the $Cr_{Eq}$ is represented on the x-axis.

3. The steel according to claim 1, wherein at least one of the following elements is in weight % (wt. %) limited to:
Ti 0.2-0.9
Nb≤0.3
Mn≤2.1-3.0.

4. The steel according to claim 1, wherein at least one of the following elements is in weight % (wt. %) limited to:
Cu 0.5-1.5
Nb 0.001-0.1
Ti 0.3-0.9
Y 0.005-0.2.

5. The steel according to claim 1 wherein the steel is in the form of a strip or a wire.

6. A compound material comprising a substrate of stainless steel onto which the steel as defined in claim 1 is provided by overlay welding.

7. A compound material according to claim 6, wherein the substrate material is a steel selected form the group AISI 316, AISI 316L, AISI 316 LN, ALLOY 800 or ALLOY 800HT.

8. A compound material according to claim 1 wherein the steel comprises 10 to 20 vol. % delta ferrite.

9. Use of the steel according to claim 1 as a welding consumable and/or a weld overlay material in a nuclear reactor or in concentrated solar power plant.

10. Use of the steel according to claim 9, wherein the nuclear reactor or the concentrated solar power plant are cooled by a lead or lead-bismuth alloy.

11. Use of the steel according to claim 10, wherein the molten lead or lead-bismuth alloy has a temperature of ≤600° C. and/or an oxygen content of at least 10-7 wt. %.

* * * * *